(12) United States Patent
Knight (10) Patent No.: US 6,968,673 B1
(45) Date of Patent: Nov. 29, 2005

(54) COOL GAS GENERATOR AND ULTRA-SAFE ROCKET ENGINE

(76) Inventor: Andrew F. Knight, 2521 Glengyle Dr., Vienna, VA (US) 22181

( * ) Notice: Subject to any disclaimer, the term of this patent is extended or adjusted under 35 U.S.C. 154(b) by 50 days.

(21) Appl. No.: 10/712,338

(22) Filed: Nov. 14, 2003

(51) Int. Cl.[7] .............. F02G 1/00; F02G 3/00; F02K 3/00
(52) U.S. Cl. .......... 60/200.1; 60/257; 60/259; 60/260
(58) Field of Search .............. 60/200.1, 221, 60/233, 240, 243, 244, 250, 257, 259, 260, 60/266, 267; 446/56; 280/736, 741; 62/600–54.3

(56) References Cited

U.S. PATENT DOCUMENTS

| | | | |
|---|---|---|---|
| 3,049,870 A * | 8/1962 | Chamberlain ................ | 60/206 |
| 3,117,424 A * | 1/1964 | Hebenstreit .................. | 222/3 |
| 3,170,295 A * | 2/1965 | Dryden ....................... | 60/39.48 |
| 3,222,230 A | 12/1965 | Hebenstreit et al. | |
| 3,232,481 A * | 2/1966 | Hebenstreit .................. | 222/3 |
| 3,269,310 A * | 8/1966 | Wismar ....................... | 102/531 |
| 3,303,651 A * | 2/1967 | Grant, Jr. et al. .......... | 60/203.1 |
| 3,640,083 A * | 2/1972 | Galbraith et al. ........... | 62/48.4 |
| 3,833,029 A | 9/1974 | Munn | |
| 4,583,362 A * | 4/1986 | Wagner ....................... | 60/259 |
| 4,589,253 A * | 5/1986 | Wagner ....................... | 60/204 |
| 4,627,822 A | 12/1986 | Esposito | |
| 4,771,600 A * | 9/1988 | Limerick et al. ............ | 60/258 |
| 5,016,914 A * | 5/1991 | Faigle et al. ................ | 280/741 |
| 5,025,623 A * | 6/1991 | Hirakoso et al. ............ | 60/257 |
| 5,078,422 A * | 1/1992 | Hamilton et al. ........... | 280/736 |
| 5,085,041 A * | 2/1992 | Scott-Scott et al. ......... | 60/244 |
| 5,099,645 A * | 3/1992 | Schuler et al. .............. | 60/219 |
| 5,280,951 A * | 1/1994 | Rizzi et al. .................. | 280/736 |
| 5,551,230 A * | 9/1996 | Meng .......................... | 60/259 |
| 5,554,230 A | 9/1996 | Huber et al. | |
| 5,636,513 A * | 6/1997 | Pahl ............................ | 60/204 |
| 5,857,699 A * | 1/1999 | Rink et al. .................. | 280/737 |
| 5,918,460 A * | 7/1999 | Connell et al. .............. | 60/257 |
| 5,931,495 A * | 8/1999 | Rink et al. .................. | 280/737 |
| 5,951,043 A | 9/1999 | Mooney et al. | |
| 6,052,987 A * | 4/2000 | Dressler ...................... | 60/260 |
| 6,226,980 B1 * | 5/2001 | Katorgin et al. ............. | 60/258 |
| 6,298,789 B1 | 10/2001 | Ericsson et al. | |
| 6,470,670 B2 * | 10/2002 | Maeding ...................... | 60/259 |
| 6,487,974 B1 | 12/2002 | Canterberry et al. | |
| 6,536,208 B1 * | 3/2003 | Kretschmer ................. | 60/258 |
| 6,634,433 B2 | 10/2003 | Kim et al. | |
| 6,769,242 B1 * | 8/2004 | Balepin ....................... | 60/204 |
| 6,832,471 B2 * | 12/2004 | Hewitt ........................ | 60/207 |
| 6,834,493 B2 * | 12/2004 | Hashimoto et al. .......... | 60/204 |

* cited by examiner

Primary Examiner—William H. Rodriguez (57) ABSTRACT

A gas generator or rocket engine includes: a first storage tank configured to contain a high-pressure liquid propellant; a nozzle connected to the first storage tank; a heat source connected between the first storage tank and the nozzle and configured to add heat to the high-pressure liquid propellant at a heat transfer rate to substantially gasify the high-pressure liquid propellant, where the nozzle is configured to expel and expand the substantially gasified high-pressure liquid propellant, and where the gas generator is configured so that an expanded temperature of the substantially gasified high-pressure liquid propellant after being expanded by the nozzle is in the range −50° C. to 100° C., preferably 0° C. to 50° C.; and a controller connected to the heat source and configured to adjust the heat transfer rate.

20 Claims, 6 Drawing Sheets

COOL GAS GENERATOR AND ULTRA-SAFE ROCKET ENGINE

BACKGROUND

Gas generators typically generate a low density gas from a high density material, such as a liquid or solid, by vaporizing the liquid or solid and/or decomposing or combusting the liquid or solid. In doing so, the resulting generated gas is typically very hot (in the case of decomposition or combustion) or excessively cold (in the case of vaporization of a liquid having a high vapor pressure at room temperature). Very hot gases can melt or damage the object that one is attempting to inflate. Very cold gases will absorb heat during the time after inflation and their volume/pressure will increase, causing explosion or damage of the object being inflated if the exact quantity of required cold gas is not calculated and regulated before inflating.

U.S. Pat. No. 4,627,822 to Esposito discloses a low temperature inflator assembly having a liquid carbon dioxide cartridge and a solid pyrotechnic gas generator. When the inflator is activated, combustion gas supplies immediate low pressure inflation while heat transferred from the generator to the cartridge accelerates vaporization of the carbon dioxide. There are many problems with Esposito. First, once activated, the inflator is completely uncontrollable. Therefore, the total volume of gas needed must be known before the inflator is even built, and its size must be adjusted accordingly. Second, the inflator is usable only a single time, because the solid pyrotechnic gas generator will decompose or combust until it is spent. Third, the temperature of the gas generated by the inflator has a varying time dependence, because the hot gas from the solid pyrotechnic gas generator is released first and the cooler evaporated carbon dioxide is released later, after being heated by heat conduction from the hot solid pyrotechnic gases.

Like conventional gas generators, rocket engines suffer from an exhaust gas that is too hot or too cold. A simple gas thruster, which is simply a container of high-pressure gas with a valve and nozzle, creates thrust by expanding the gas through the nozzle in one direction. Due to the Joule-Thomson and other effects, the expanded gas is excessively cold, and the performance and specific impulse of such a system is very low. To increase specific impulse, a typical combustion-type rocket engine combusts reactive substances to create very hot, high-pressure gases and expands these gases through a nozzle in one direction. These hot gases are typically much higher than the melting point of the nozzle, so that either regenerative, ablative, or other cooling of the nozzle is necessary. Such nozzles are expensive, and a slight miscalculation can result in explosion of the nozzle. Further, in addition to the risk of explosion, such rocket engines are very unsafe because of the hot gases being ejected. While amateur and model rocketry currently utilizes relatively safe solid propellant rocket engines, such engines still create dangerous hot gases.

SUMMARY OF THE INVENTION

The present invention aims to solve one or more of these and other problems.

In a preferred embodiment of the present invention, an external combustion cool gas generator may comprise: a first storage tank configured to contain a high-pressure liquid propellant; a second storage tank configured to contain a reactive chemical; a combustion chamber connected to the second storage tank and configured to chemically react the reactive chemical to form a hot product gas at a pressure substantially lower than a pressure of the high-pressure liquid propellant; a nozzle having a melting temperature; a heat exchanger connected to the first storage tank at a first end and connected to the nozzle at a second end, the heat exchanger configured to plumb the high-pressure liquid propellant from the first storage tank to the nozzle, wherein the heat exchanger is connected to the combustion chamber so that heat from the hot product gas is transferred to the high-pressure liquid propellant through heat-conducting walls of the heat exchanger to thereby raise a temperature of the high-pressure liquid propellant to substantially gasify the high-pressure liquid propellant, wherein the nozzle is configured to expel the substantially gasified high-pressure liquid propellant from the gas generator and, during the expulsion, to expand the substantially gasified high-pressure liquid propellant, and wherein the gas generator is configured so that an expansion temperature of the substantially gasified high-pressure liquid propellant to be expanded by the nozzle is substantially lower than the melting temperature. The gas generator may be configured so that the expansion temperature is in the range 0° C. to 100° C. The gas generator may be configured so that the expansion temperature is such that an expanded temperature of the substantially gasified high-pressure liquid propellant after being expanded by the nozzle is in the range −50° C. to 100° C., or preferably 0° C. to 50° C. Preferably, the high-pressure liquid propellant comprises a liquid that, at room temperature, has a vapor pressure substantially greater than 1 atm, such as liquid carbon dioxide. The nozzle may be configured to expel substantially only the substantially gasified high-pressure liquid propellant.

In a preferred aspect, the gas generator may further comprise a first valve configured to be capable of substantially continuously adjusting a flow rate of the high-pressure liquid propellant to the nozzle, and a second valve configured to be capable of substantially continuously adjusting a flow rate of the hot product gas through the heat exchanger. The gas generator may further comprise a temperature sensor configured to measure the expansion temperature, and a controller connecting the temperature sensor to the second valve and configured to adjust the second valve based on the expansion temperature so as to adjust the expansion temperature to a target expansion temperature.

In another preferred aspect, the gas generator may be a rocket engine, wherein the nozzle has an expansion ratio of at least 3, wherein the nozzle is configured to expel the substantially gasified high-pressure liquid propellant substantially in one direction, and wherein the expulsion of the substantially gasified high-pressure liquid propellant causes an impulse reaction on the rocket engine in an opposite direction.

In another preferred aspect, the gas generator is configured to be air-breathing, such that the reactive chemical is chemically reactive with air and the combustion chamber is configured to combust the reactive chemical with the air.

In another preferred embodiment of the present invention, a cool gas generator may comprise: a first storage tank configured to contain a high-pressure liquid propellant; a nozzle connected to the first storage tank; a heat source connected between the first storage tank and the nozzle and configured to add heat to the high-pressure liquid propellant at a heat transfer rate to substantially gasify the high-pressure liquid propellant, wherein the nozzle is configured to expel the substantially gasified high-pressure liquid propellant from the gas generator and, during the expulsion, to expand the substantially gasified high-pressure liquid propellant, and wherein the gas generator is configured so that an expanded temperature of the substantially gasified high-pressure liquid propellant after being expanded by the nozzle is in the range −50° C. to 100° C., preferably in the range 0° C. to 50° C.; and a controller connected to the heat source configured to adjust the heat transfer rate. Preferably, the high-pressure liquid propellant comprises a liquid that, at room temperature, has a vapor pressure substantially greater than 1 atm, such as liquid carbon dioxide. The nozzle may be configured to expel substantially only the substantially gasified high-pressure liquid propellant.

In a preferred aspect, the nozzle has a melting temperature, and the gas generator is configured so that an expansion temperature of the substantially gasified high-pressure liquid propellant to be expanded by the nozzle is substantially lower than the melting temperature. Preferably, the expansion temperature is in the range 0° C. to 100° C. The gas generator may further comprise a temperature sensor connected to the controller and configured to measure the expansion temperature, wherein the controller is configured to adjust the heat transfer rate based on the expansion temperature so as to adjust the expansion temperature to a target expansion temperature.

In another preferred aspect, the high-pressure liquid propellant may comprise: a liquid that, at room temperature, has a vapor pressure substantially greater than 1 atm; and a decomposable chemical that decomposes upon reaction with a catalyst, and wherein the heat source comprises the catalyst.

In another preferred aspect, the heat source may comprise: a second storage tank configured to contain a reactive chemical; a combustion chamber connected to the second storage tank and configured to chemically react the reactive chemical to form a hot product gas, and wherein the heat source is configured to mix the high-pressure liquid propellant with the hot product gas. Preferably, substantially all of the hot product gas formed by the heat source remains a gas at the expanded temperature. A composition of the high-pressure liquid propellant and a composition of the hot product gas may be substantially the same.

In another preferred aspect, the heat source may comprise: a second storage tank configured to contain a reactive chemical; and a combustion chamber connected to the second storage tank and configured to chemically react the reactive chemical to form a hot product gas, and wherein the controller comprises a valve to adjust the heat transfer rate from the hot product gas to the high-pressure liquid propellant. The gas generator may be configured to be air-breathing, such that the reactive chemical is chemically reactive with air and the combustion chamber is configured to combust the reactive chemical with the air.

In another preferred aspect, the gas generator is a rocket engine, wherein the nozzle has an expansion ratio of at least 3, wherein the nozzle is configured to expel the substantially gasified high-pressure liquid propellant substantially in one direction, and wherein the expulsion of the substantially gasified high-pressure liquid propellant causes an impulse reaction on the rocket engine in an opposite direction.

In another preferred embodiment of the present invention, an external combustion cool gas generator may comprise: means for providing a high-pressure liquid propellant; a nozzle connected to the means; a first heat source; a first heat exchanger connecting the first heat source to at least one of the means and the nozzle so that heat from the first heat source is transferred to the high-pressure liquid propellant through heat-conducting walls of the first heat exchanger to thereby gasify the high-pressure liquid propellant; a second heat source; and a second heat exchanger connecting the second heat source to at least one of the means and the nozzle so that heat from the second heat source is transferred to the gasified high-pressure liquid propellant to thereby raise a temperature of the gasified high-pressure liquid propellant above a temperature of the high-pressure liquid propellant, wherein the nozzle is configured to expel the gasified high-pressure liquid propellant from the gas generator and, during the expulsion, to expand the gasified high-pressure liquid propellant. Preferably, the high-pressure liquid propellant comprises a liquid that, at room temperature, has a vapor pressure substantially greater than 1 atm, such as liquid carbon dioxide. The nozzle may be configured to expel substantially only the substantially gasified high-pressure liquid propellant.

In a preferred aspect, the gas generator is configured so that an expanded temperature of the substantially gasified high-pressure liquid propellant after being expanded by the nozzle is in the range −50° C. to 100° C., preferably in the range 0° C. to 50° C. Further, the nozzle may have a melting temperature, wherein the gas generator is configured so that an expansion temperature of the substantially gasified high-pressure liquid propellant to be expanded by the nozzle is substantially lower than the melting temperature, and preferably in the range 0° C. to 100° C. The gas generator may further comprise a temperature sensor configured to measure the expansion temperature, and a controller connected to the temperature sensor and configured to adjust at least one of the first and second heat sources and the first and second heat exchangers based on the expansion temperature so as to adjust the expansion temperature to a target expansion temperature.

In another preferred aspect, the gas generator may further comprise a nozzle valve configured to be capable of substantially continuously adjusting a flow rate of the gasified high-pressure liquid propellant to the nozzle. The nozzle valve may be configured to regulate a pressure inside the means to a threshold operating pressure, such that: a) when the pressure is less than the threshold operating pressure, the valve is closed; and b) when the pressure rises above the threshold operating pressure, the valve variably opens as a function of the pressure, so that the pressure does not rise to substantially greater than the threshold operating pressure.

In another preferred aspect, the gas generator may be a rocket engine, wherein the nozzle has an expansion ratio of at least 3, wherein the nozzle is configured to expel the substantially gasified high-pressure liquid propellant substantially in one direction, and wherein the expulsion of the substantially gasified high-pressure liquid propellant causes an impulse reaction on the rocket engine in an opposite direction.

In another preferred aspect, at least one of the first and second heat sources comprises: a storage tank configured to contain a reactive chemical; and a combustion chamber configured to chemically react the reactive chemical to form a hot product gas at a pressure substantially lower than a pressure of the high-pressure liquid propellant. The gas generator may further comprise a nozzle valve configured to be capable of adjusting a flow rate of the gasified high-pressure liquid propellant to the nozzle, wherein the first heat exchanger comprises a first valve configured to be capable of adjusting a flow rate of the hot product gas through the first heat exchanger, and the second heat exchanger comprises a second valve configured to be capable of adjusting a flow rate of the hot product gas through the second heat exchanger. The gas generator may be configured to be air-breathing, such that the reactive chemical is chemically reactive with air and the combustion chamber is configured to combust the reactive chemical with the air.

In another preferred aspect, the means for providing the high-pressure liquid propellant may comprise a storage tank pressurized to high pressure and configured to carry most or all of the propellant, or the means may comprise a pump configured to pump the propellant from a low-pressure storage tank to a high-pressure reservoir. The reservoir may be large or small, and may comprise only the conduit from the outlet of the pump to the nozzle or one of the heat exchangers.

DETAILED DESCRIPTION OF PREFERRED EMBODIMENTS

Figure 1:
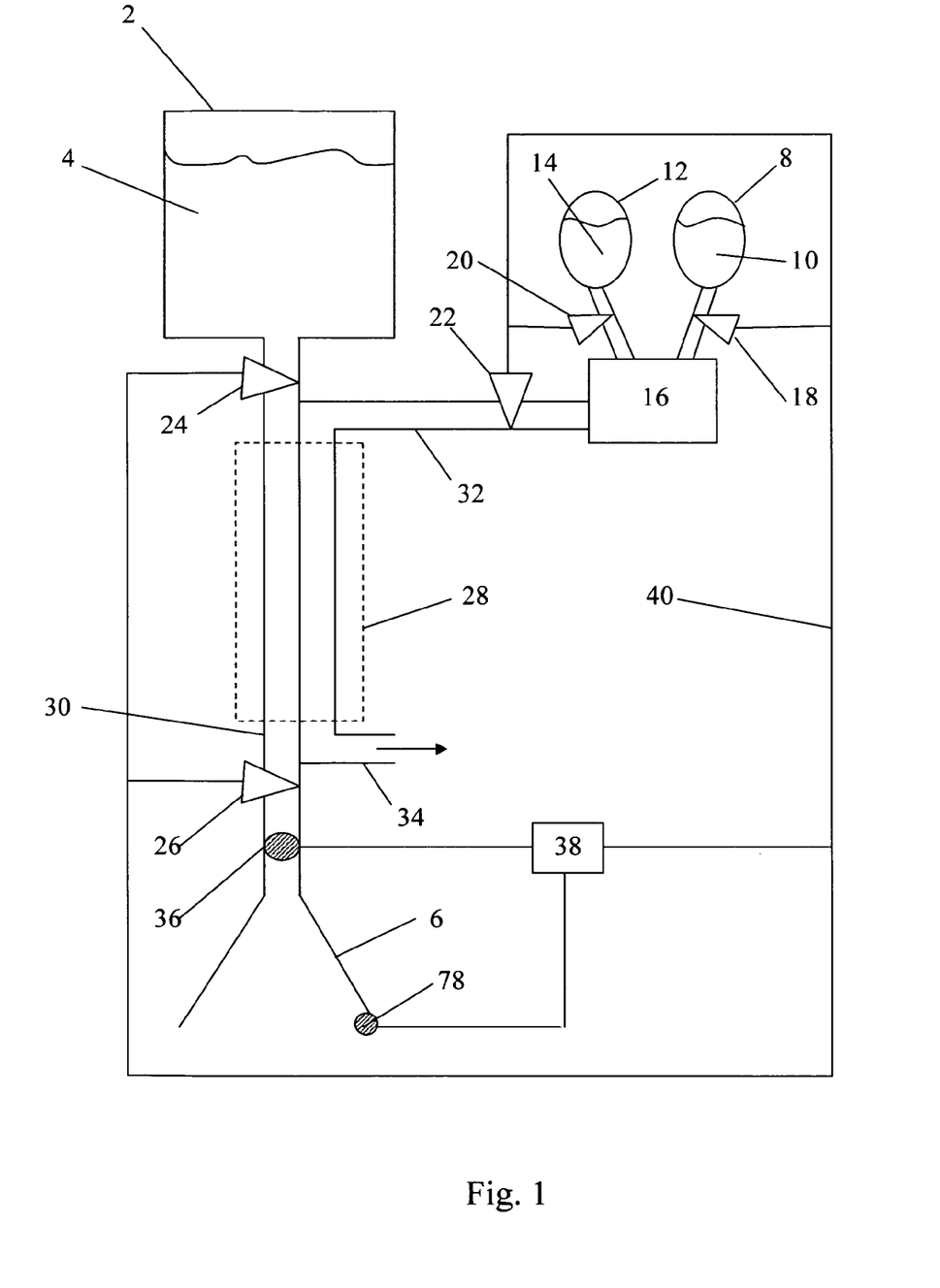
FIGS. 1–6 show diagrams of preferred embodiments of the present invention.

Referring now to FIG. 1, an external combustion cool gas generator (which may be implemented as a rocket engine) comprises a first storage tank 2, a high-pressure liquid propellant 4, a nozzle 6, a second propellant storage tank 8, a first reactive chemical or propellant 10, a third propellant storage tank 12, a second reactive chemical or propellant 14, a combustion chamber 16, a heat exchanger 28, a conduit 30 connecting the first storage tank 2 to the nozzle 6, a conduit 32 connecting the combustion chamber 16 to the heat exchanger 28, an exhaust conduit 34 for the combustion chamber 16, valves 18, 20, 22, 24, and 26, temperature sensors 36, 78, and a controller 38 connecting the temperature sensors 36, 78 to the valves 18, 20, 22, 24, and 26 via electronic line 40. Preferably, liquid propellant 4 is a liquid that, at room temperature, has a vapor pressure substantially higher than 1 atmosphere, such as greater than 100 psia, preferably greater than 400 psia or 600 psia. In this embodiment, propellant 4 is not particularly chemically reactive, and is not intended to chemically react with any chemical in the system, such as propellants 10, 14. For example, propellant 4 may be one of many well-known liquid refrigerants, such as liquid carbon dioxide, which has a vapor pressure well in excess of 600 psia at room temperature. Propellant 4 is a working medium to be heated, vaporized, and expanded through nozzle 6 to produce an expanded, cool gas that is neither too hot nor too cold (in the case of a rocket engine application, the expansion of the gasified high-pressure liquid propellant 4 through the nozzle 6 creates thrust). In the case that the gas generator is implemented as a rocket engine, the nozzle 6 should expand the gasified propellant 4 to a level sufficient to accelerate the propellant 4 to provide thrust. Thus, the nozzle 6 preferably has an expansion ratio of at least 3, preferably of at least 10, and most preferably at least 20.

By opening valve 26 without providing heat via the heat exchanger 28, propellant 4 is transferred to the nozzle 6 via conduit 30 and released from the nozzle 6 into an ambient pressure much lower than the pressure of the liquid propellant 4 inside the first storage tank 2, resulting in vaporization and expansion of the liquid propellant 4 from the nozzle 6. This vaporization and expansion causes the temperature of the liquid propellant 4 to drop substantially.

Preferably, propellants 10 and 14 are an oxidizer and fuel, respectively or vice versa. Propellants 10, 14 may be liquid at standard temperature and pressure, or, like propellant 4, may be liquids with a high vapor pressure at room temperature. Propellants 10, 14 may be delivered to combustion chamber 16 via their own vapor pressure, gravity, a pump, and/or pressure supplied by a pressurant bottle (such as a regulated tank of high-pressure nitrogen gas, not shown). When valves 18, 20, which may be binary or continuously variable (as with any of the valves disclosed herein), are opened, the propellants 10, 14 flow into combustion chamber 16. If they are hypergolic, they may ignite spontaneously; if not, they may be ignited by any means known, such as pyrotechnically or with an electric squib (not shown). The propellants 10, 14 react to form hot product gases, which may be introduced into the heat exchanger 28 via valve 22. Propellants 10, 14 could, of course, be gases or solids. Examples of propellants 10, 14 could include kerosene and liquid oxygen, although a wide range of possible propellants are well known in the art. Further, the third storage tank 12/second reactive propellant 14 may be eliminated, in the case that the first reactive propellant 10 is a monopropellant or a decomposable chemical, such as hydrogen peroxide. In such an embodiment, the combustion chamber 16 may include a catalyst to induce reaction and/or decomposition of the first reactive propellant 10, thus creating hot product gas to be plumbed to the heat exchanger 28 via the conduit 32 and valve 22.

Further, the third storage tank 12/second reactive propellant 14 system could include or could instead be replaced by an air compressor system configured to deliver air as a chemical reactant 14 to the combustion chamber 16. Air compressors are well known in the art, and such an air compressor could be powered, e.g., by burning some of first reactive propellant 10 with air. In such an embodiment, the gas generator/rocket engine is at least partially air-breathing, as some of the energy in the hot product gas produced by the combustion chamber 16 is the result of chemical reaction with gaseous oxygen in the air.

The heat exchanger 28 is a system in which heat from the hot product gases generated by the combustion chamber 16 is conductively transferred to the high-pressure liquid propellant 4 via walls of the heat exchanger 28. Preferably, conduits 30 and 32 are closed to each other so that no mixing of the hot product gases (which are preferably at low pressure, such as slightly above atmospheric, such as 20 psia) and the high-pressure liquid propellant (which is at high pressure, such as 600 to 1000 psia) occurs. A result of this is that the nozzle 6 is configured to expel substantially only the gasified high-pressure propellant 4, and is not configured to expel any of the (cooled) hot product gases generated by combustion chamber 16 and cooled in heat exchanger 28. Heat exchangers, including their design and material composition (preferably a high-heat-conductive material, such as copper) are well known in the art. Heat exchanger 28 may be designed so that the hot product gases in conduit 32 and the high-pressure liquid propellant 4 in conduit 30 flow in the same direction (as shown in FIG. 1) or in opposite directions (not shown).

The hot product gases cool as they flow through heat exchanger 28 (because they are transferring their heat to the high-pressure liquid propellant 4, which is heating as it flows through heat exchanger 28 via conduit 30), and are finally exhausted via exhaust conduit 34. Exhaust conduit 34 may be pointed in the same direction as nozzle 6 and may also include an expansion nozzle (not shown), if the pressure within combustion chamber 16 is substantially greater than ambient pressure. However, preferably, the pressure in combustion chamber 16 is sufficient only to induce flow of the hot product gas through the heat exchanger 28 to the exhaust conduit 34, in which case the (cooled) hot product gas contains insufficient heat and pressure to provide any substantial thrust. Thus, preferably, the (cooled) hot product gas is just dumped to the side of the gas generator/rocket engine.

Preferably, the rate of heat transfer in the heat exchanger 28 is sufficient to substantially vaporize or gasify the high-pressure liquid propellant 4 and to subsequently heat the substantially gasified propellant 4, but not so much that the expansion temperature of the substantially gasified propellant 4 (i.e., the temperature of the substantially gasified propellant 4 just before being expanded by nozzle 6) is greater than a melting temperature of the nozzle 6. Here, "melting" temperature may mean the point at which the material of the nozzle 6 begins to liquefy, or to otherwise render the nozzle 6 incapable of performing its function of expanding the substantially gasified high-pressure propellant 4. The rate of heat transfer per mass of propellant 4 passing through the heat exchanger 28 may be adjusted by: a) adjusting the flow rate of the propellant 4 through the heat exchanger 28 via one or both of valves 24, 26; b) adjusting the flow rate of hot product gas through the heat exchanger 28 via valve 22; and/or c) adjusting the generation of the hot product gas by adjusting the introduction of one or both of propellants 10, 14 via valves 18, 20, respectively.

In order to regulate the expansion temperature of the substantially gasified propellant 4 to be expanded by the nozzle 6, a temperature sensor 36 or its equivalent may be attached and configured to measure the expansion temperature and generate a corresponding signal for processing by the controller 38. The controller 38 is programmed to adjust (preferably continuously adjustable) valves 18, 20, 22, 24, 26 via signals traveling through electronic line 40 so as to provide the proper heat transfer per mass of propellant 4 to propellant 4 via heat exchanger 28. Controller 38 may be responsive to user input. For example, controller 38 may comprise a display (not shown) configured to display the expansion temperature, and an input device (not shown) configured to accept an input from a human user to adjust one or more of valves 18, 20, 22, 24, 26. Further, the controller 38 may be configured to allow the user to input a desired thrust level (determined in large part by the mass flow rate of propellant 4 through nozzle 6), and the controller 38 may respond by further opening valves 24, 26 (to increase mass flow rate of propellant 4), and simultaneously to further open valves 18, 20, 22 in a predetermined manner to increase total hot product gas generation, so that the total heat transferred per mass of propellant 4 to propellant 4 via heat exchanger 28 remains about constant. The controller 38 may be configured to adjust the expansion temperature toward a desired target expansion temperature, which may or may not be entered by the user. For example, if the user inputs a target expansion temperature of 50° C., and the temperature sensor 36 measures an expansion temperature of 46° C., then the controller 38 may provide a signal to further open one or more of valves 18, 20, 22, to increase production of the hot product gas and to increase the flow rate of the hot product gas through the heat exchanger 28. The logic necessary and the construction of the controller 38 to provide such a closed-loop negative feedback system will be understood by one skilled in the art. The gas generator/rocket engine may also or instead include a temperature sensor 78, also connected to the controller 38, that measures an expanded temperature of the gasified high-pressure propellant 4 (i.e., a temperature of the propellant 4 after being expanded through the nozzle 6). As will be understood, the output signals of the controller 38 to the valves 18, 20, 22, 24, 26 may be influenced by the temperature sensor 78 in a similar manner.

In a preferred embodiment, the controller 38 is configured/programmed to regulate the expansion temperature to remain substantially less than the melting temperature of the nozzle 6, preferably in the range −50° C. to 200° C., preferably in the range 0° C. to 100° C., preferably in the range 50° C. to 100° C. Further or alternatively, controller 38 may be configured/programmed to regulate the expanded temperature to remain in the range −50° C. to 100° C., preferably in the range 0° C. to 50° C., preferably in the range 15° C. to 35° C., and most preferably approximately room temperature. A benefit to such a gas generator, of course, is that an object may be inflated by the gas generator at approximately ambient temperature, so that the object is not damaged by excessively hot gas, and the object is not damaged by subsequent warming and expanding of excessively cold gas. Further, where the gas generator is implemented as a rocket engine, the rocket engine is very safe, because the high-pressure regions (e.g., storage tank 2, conduit 30, nozzle 6) are localized in relatively cool regions of the rocket (places that are not subject to combustion or decomposition), and the hot regions of the rocket engine (e.g., combustion chamber 16, conduit 32) are localized in relatively low-pressure regions of the rocket (places that are not acted upon by high-pressure liquid propellant 4). For example, a rocket engine configured so that the expanded temperature is approximately room temperature, according to the present invention, could be safely used as a rocket engine demonstration indoors for a class of students, because the rocket engine does not generate extremely hot, high speed exhaust gases flowing supersonically from the nozzle 6. The exhaust gases emitted from exhaust conduit 34 should also be substantially cooled and easily controllable.

Figure 2:
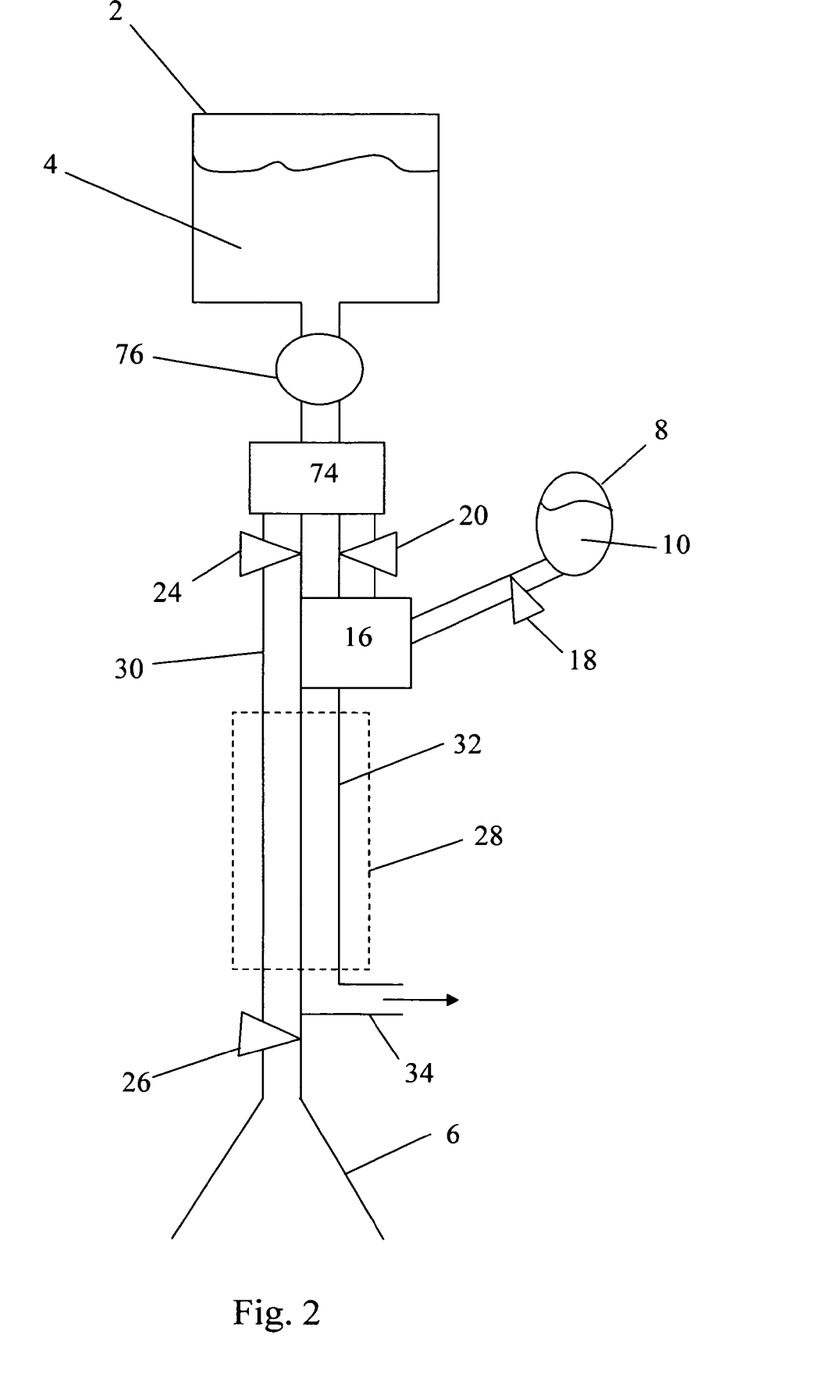

Referring now to FIG. 2, the embodiment shown is similar to the embodiment shown in FIG. 1, with a few changes. First, the first storage tank 2 may be a low-pressure tank and the liquid propellant 4 may have a relatively low vapor pressure (such as less than 100 psia, or even less than 1 atmosphere) at room temperature. The liquid propellant 4 may be fed at high pressure to a high-pressure storage tank 74 via a fluid pump 76. Fluid pumps are well known in the art. A particularly fine specimen is disclosed in U.S. Pat. No. 6,499,288, although the present inventor may be slightly biased. While shown in FIG. 2 as a box, the high-pressure storage tank 74 may simply refer to an uppermost portion of the conduit 30. In the embodiment shown in FIG. 2, the combination of (low-pressure) storage tank 2 and pump 76 is a means for providing a high-pressure liquid propellant 4, while in FIG. 1, the (high-pressure) storage tank 2 capable of storing a high-pressure liquid propellant 4 is a means for providing a high-pressure liquid propellant 4.

Second, liquid propellant 4 may serve also as the second reactive propellant (14 in FIG. 1). For example, the liquid propellant 4 may be liquid nitrous oxide, an oxidizer, and the first reactive propellant 10 may be a fuel such as gasoline or propane. If pump 76 is present, the liquid nitrous oxide (which has a vapor pressure well in excess of 600 psia at room temperature) may be cooled to a vapor pressure of less than atmospheric; doing so will reduce the pressure requirements of the first storage tank 2 and therefore reduce the mass of the system. If pump 76 is not present (e.g., if nitrous oxide were used at the high-pressure liquid propellant 4 and the second reactive propellant 14 in the embodiment shown in FIG. 1), then the liquid propellant 4 should have a very high vapor pressure at room temperature, as discussed previously. Therefore, the liquid propellant 4 may serve both as the working medium whose vaporization and expansion through nozzle 6 creates thrust (in the case of a rocket engine application) as well as a reactive propellant to react with reactive propellant 10 to create the hot product gas that heats the liquid propellant via heat exchanger 28.

It should be clear to one skilled in the art that any of the features and/or modifications shown in FIG. 2 (or any drawing in the present application) may be applied to the embodiment shown in FIG. 1 (or in any drawing in the present application), and vice versa. For example, the temperature sensor and controller system 36, 38, 40, 78 of the embodiment in FIG. 1 may be applied to the embodiment shown in FIG. 2. The embodiments shown in the drawings are for illustrative purposes only, to illustrate various features which may be mixed and matched as desired.

Figure 3:
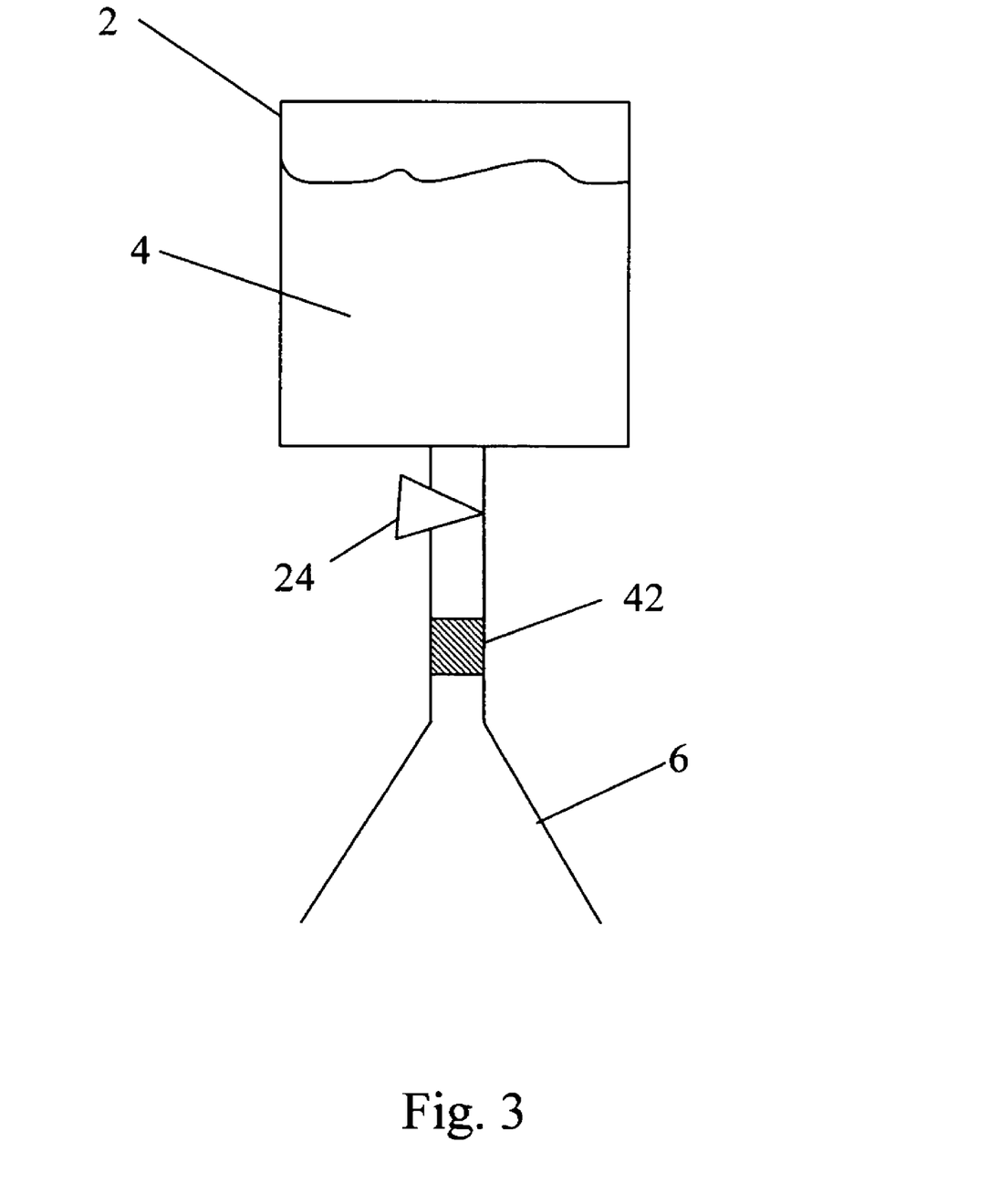

Referring now to FIG. 3, a gas generator or rocket engine comprises the first storage tank 2, the high-pressure liquid propellant 4, nozzle 6, valve 24, and a controllable catalyst 42 which may serve as the heat source. In this embodiment, the high-pressure liquid propellant preferably comprises a liquid that has a vapor pressure substantially greater than 1 atm at room temperature, such as liquid carbon dioxide, mixed with a decomposable chemical that decomposes upon reaction with a catalyst. Catalysts are well known in the art. For example, the propellant 4 may comprise hydrogen peroxide in solution with the liquid carbon dioxide. When the valve 24 is opened, high-pressure liquid propellant 4 flows through the catalyst 42, causing the decomposable chemical to decompose and create heat. The heat generated by this decomposition is transferred to the liquid propellant 4, causing the liquid propellant 4 to gasify and its temperature to rise. The gasified high-pressure propellant 4 is then expanded through the nozzle 4, to generate gas for inflating an object or to create thrust (in a rocket engine application). The catalyst 42 may be actively controllable during operation of the rocket engine, such as by varying its surface area exposed to propellant 4 (thus controlling the reaction rate/heat transfer rate and resulting expansion temperature of the gasified propellant 4), or the catalyst may be controlled before operation of the rocket engine by adjusting its size and/or surface area exposed to the propellant 4. Further, valve 24 may serve as a controller to adjust the flow rate of propellant 4 through the catalyst 42, thus adjusting the total heat transfer rate to the propellant 4. Valve 24 may be binary or continuously variable.

Figure 4:
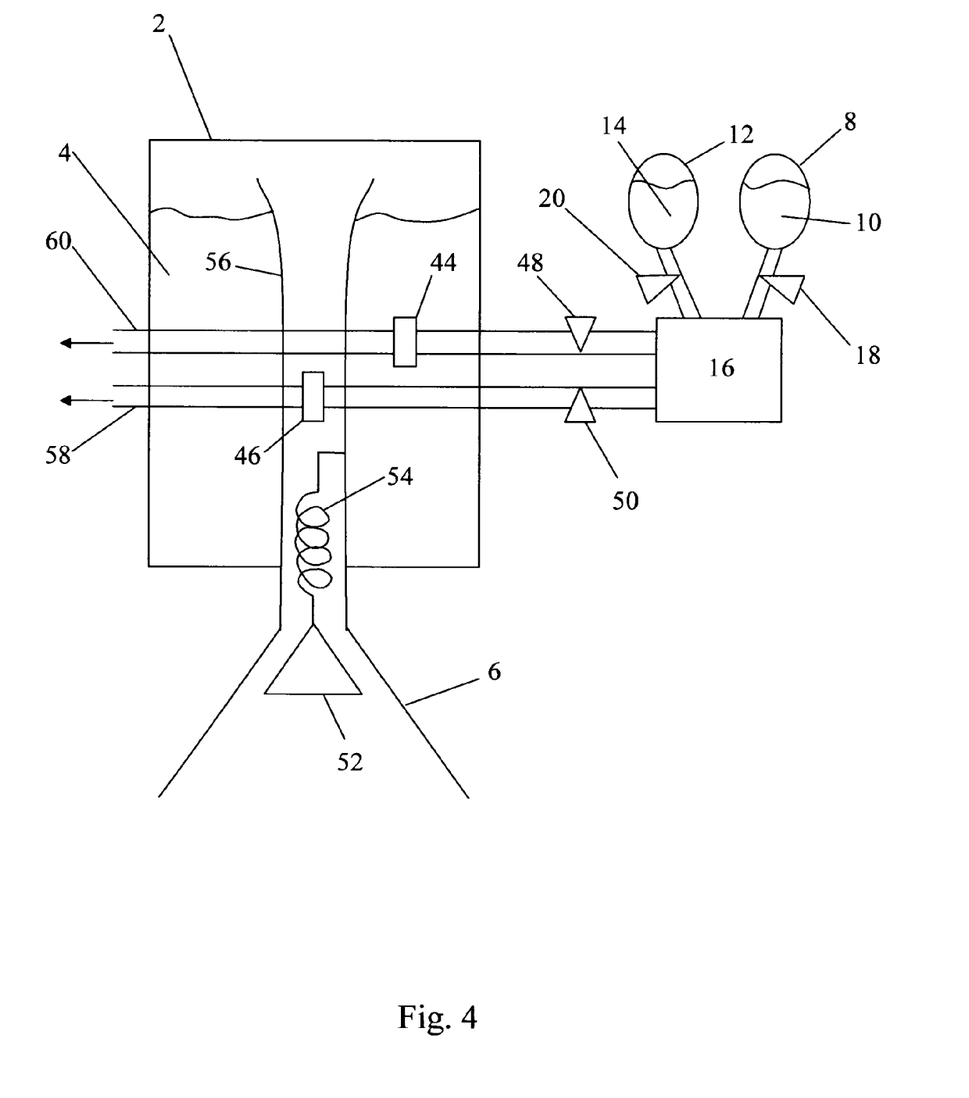

Referring now to FIG. 4, a gas generator/rocket engine comprises a first storage tank 2 storing a high-pressure liquid propellant 4, a nozzle 6, and conduit 56 fluidly connecting the nozzle 6 to an upper portion of the first storage tank 2 (to a region above the fluid boundary layer or meniscus of the high-pressure liquid propellant 4) so that the conduit 56 is in fluid connection with the vapor of the high-pressure liquid propellant 4. As in the embodiment shown in FIG. 1, the embodiment shown in FIG. 4 has second and third storage tanks 8, 12 with first and second reactant propellants 10, 14 regulated by valves 18, 20 and combusting in combustion chamber 16. However, unlike in FIG. 1, the embodiment shown in FIG. 4 comprises: a first heat exchanger 44 preferably located inside the first storage tank 2 in the liquid region of the high-pressure liquid propellant 4 and configured to gasify the high-pressure liquid propellant 4; and a second heat exchanger 46 preferably located inside the first storage tank 2 (such inside conduit 56, as shown) in the vapor region of the high-pressure liquid propellant 4 and configured to increase the temperature of the gasified high-pressure propellant 4. The first heat exchanger 44 is connected to the combustion chamber 16 via (preferably continuously variable) valve 48 and has an exhaust 60. The second heat exchanger 46 is connected to the combustion chamber 16 via (preferably continuously variable) valve 50 and has an exhaust 58. A benefit to this embodiment over other embodiments is that two parameters of the system, the pressure inside the first storage tank 2 (which directly affects mass flow rate of propellant 4 and thrust, in the case of a rocket engine application) and the expansion temperature of the gasified propellant 4 prior to expansion through the nozzle 6, may be relatively decoupled from each other—i.e., they may be adjusted relatively independently of each other. The pressure inside the first storage tank 2 may be increased by increasing the flow rate of hot product gas through the first heat exchanger 44 by further opening valve 48 and/or increasing combustion in the combustion chamber 16 by further opening one or both of valves 18, 20. Further, the temperature of gasified high-pressure propellant 4 may be increased by increasing the flow rate of hot product gas through the second heat exchanger 44 by further opening valve 50 and/or increasing combustion in the combustion chamber 16 by further opening one or both of valves 18, 20. As discussed, any of the features of any other embodiment disclosed herein may be applied to the embodiment of FIG. 4. For example, one or both of the temperature sensors 36, 78 and the controller 38 and electronic line 40 may be applied to regulate any or all of valves 18, 20, 48, 50, 52 (described in a moment) to adjust the expansion or expanded temperature of gasified high-pressure propellant 4. Further, the first storage tank 2 may include a pressure sensor (not shown) providing a pressure signal to the controller 38, and the controller 38 may be configured to adjust this pressure to a target pressure by adjusting any or all of the valves.

Also shown in FIG. 4 is a spring-loaded valve 52 supported by a spring 54 or its equivalent. The spring may have a preset spring constant or may be adjustable. The spring-loaded valve 52 may be configured to be closed—i.e., to prevent flow of propellant 4 through nozzle 6—when the pressure inside the first storage tank 2 is below a threshold pressure, and may be opened when the pressure inside the first storage tank 2 exceeds the threshold pressure. The spring-loaded valve may be binary (i.e., on or off) but is preferably continuously variable, where the degree to which the valve is opened depends on how much the pressure inside first storage tank 2 exceeds the threshold pressure, so that the pressure does not rise substantially above the threshold pressure. Conventional pressure regulators work in basically the same way, and are well known in the art. Valve 52 is shown as spring-loaded with spring 54 only for illustration. As well understood in the art, the valve 52/spring 54 combination may be replaced with any equivalent system, such as but not limited to a closed negative feedback electronic system having a electronic pressure sensor, an electronic controller, and an electronically adjustable valve 52. A benefit to using valve 52 is that the pressure inside the first storage tank 2 can remain at its optimum pressure throughout operation of the gas generator/rocket engine.

Figure 5:
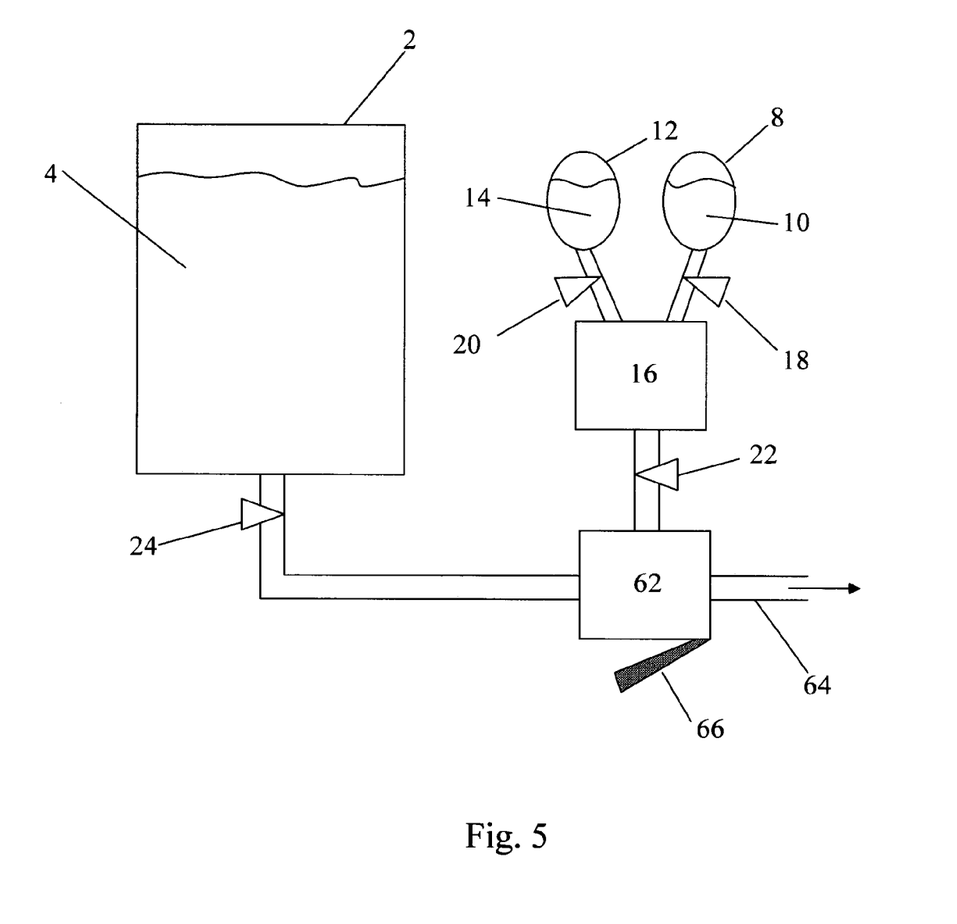

Referring now to FIG. 5, a gas generator is shown that is similar to the one shown in FIG. 1, except that the heat exchanger 28 of FIG. 1 (in which heat is transferred via heat-conducting walls from the closed hot product gas system to the closed high-pressure liquid propellant 4 system) has been replaced by a mixer 62 having a preferably hand-operated valve 66 and an exhaust 64. In this embodiment, the hot product gas from the combustion chamber 16 and the high-pressure liquid propellant 4 are fed directly into the mixer 62 where they mix with each other; the hot product gas heats the cold expanded propellant 4 and the cold expanded propellant 4 cools the hot product gas, so that the mixed gas emitted from exhaust 64 is a cool expanded gas, preferably in one of the safe temperature ranges previously discussed, and most preferably at approximately room or ambient temperature. In this embodiment, the pressure inside mixer 62 is not substantially higher than atmospheric, so that the high-pressure liquid propellant 4 must be allowed to expand to near atmospheric pressure in or before the mixer 62. Typically, the adiabatic expansion of a high-pressure liquid will result in a very cold gas mixed with very cold tiny liquid drops. This mixture is fed to the mixer 62 where it is mixed with the hot product gas from the combustion chamber 16, and the temperature of the mixture averages, preferably to within one or more of the temperature ranges previously discussed.

Figure 6:
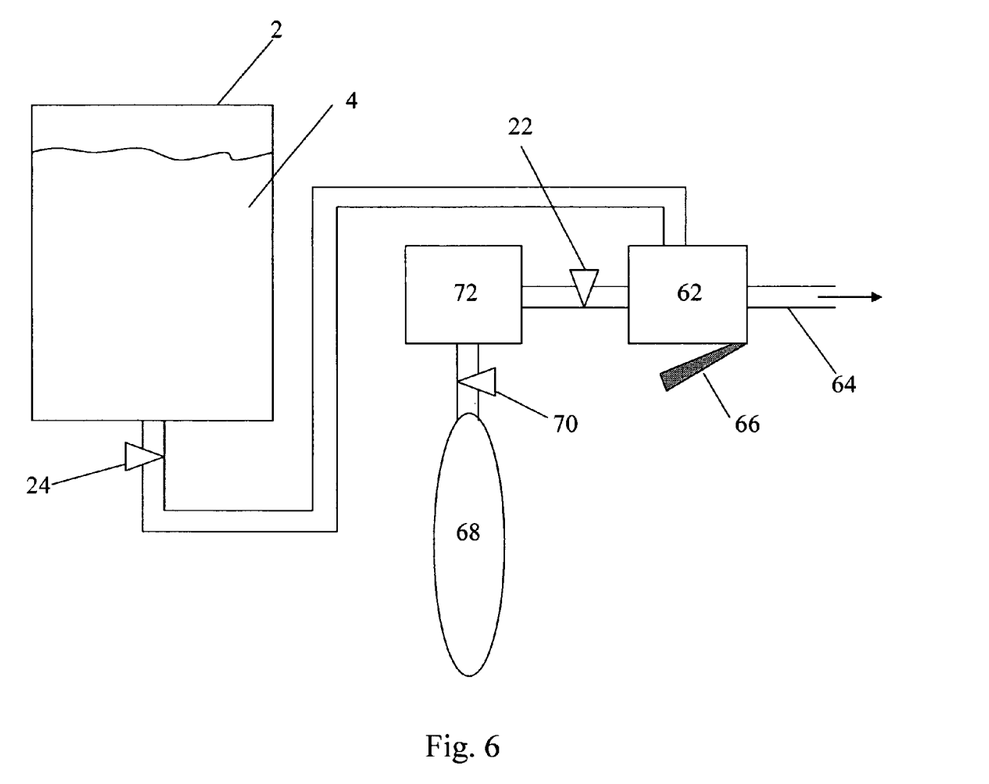

Referring now to FIG. 6, a gas generator is shown that is similar to the embodiment in FIG. 5, except that the combustion chamber 16 with storage tanks 8, 12, etc., has been replaced with a storage tank 68 containing a gaseous or liquid reactive propellant, a combustion chamber 72 containing a preferably solid propellant, and a valve 70. Most preferably, substantially all of the hot product gases generated by this combination remain in a gas form at the expanded temperature of the system. For example, if the target expanded temperature of the gas from this gas generator is less than 0° C. (much less than the condensation point of water), then the propellants inside tank 68 and combustion chamber 72 should be chosen such that the hot product gas contains no water vapor. For example, if combustion chamber 72 contains graphite (pure carbon) and tank 68 contains nitrous oxide, then the hot product gases will consist primarily of carbon dioxide and nitrogen, both of which are gases at 0° C. This will ensure that, if the gas generator is used to inflate an object, the inflated object does not contain solids or liquids such as water. Further, in another embodiment, the gas generator could be configured so that the hot product gas has substantially the same composition as the high-pressure liquid propellant 4. For example, if propellant 4 is liquid carbon dioxide, then the combustion chamber 72 may contain graphite and the tank 68 may contain gaseous oxygen, so that the hot product gas is pure carbon dioxide (which is the same as the gasified propellant 4). In both FIGS. 5 and 6, hand-operated valve 66 may be in addition to or a replacement for any of valves 18, 20, 22, 24, 70, and may be continuously variable. Thus, a human user may, by hand, control (in a binary or variable manner) generation and/or emission of gas from exhaust 64. Because the temperature of the gas is regulated (either the expansion temperature or expanded temperature or both) to a safe level, the gas generator with the hand-operated valve 66 should be safe for handling and using.

I claim:

1. An external combustion cool gas generator comprising:
   a first storage tank configured to contain a high-pressure liquid propellant;
   a second storage tank configured to contain a reactive chemical;
   a combustion chamber connected to the second storage tank and configured to chemically react the reactive chemical to form a hot product gas at a pressure substantially lower than a pressure of the high-pressure liquid propellant;
   a nozzle having a melting temperature;
   a heat exchanger connected to the first storage tank at a first end and connected to the nozzle at a second end, the heat exchanger configured to plumb the high-pressure liquid propellant from the first storage tank to the nozzle, wherein the heat exchanger is connected to the combustion chamber so that heat from the hot product gas is transferred to the high-pressure liquid propellant through heat-conducting walls of the heat exchanger to thereby raise a temperature of the high-pressure liquid propellant to substantially gasify the high-pressure liquid propellant,
   wherein the nozzle is configured to expel the substantially gasified high-pressure liquid propellant from the gas generator and, during the expulsion, to expand the substantially gasified high-pressure liquid propellant, and
   wherein the gas generator is configured so that an expansion temperature of the substantially gasified high-pressure liquid propellant to be expanded by the nozzle is substantially lower than the melting temperature.

2. The gas generator as in claim 1, wherein the gas generator is configured so that the expansion temperature is in the range 0° C. to 100° C.

3. The gas generator as in claim 1, further comprising a first valve configured to be capable of substantially continuously adjusting a flow rate of the high-pressure liquid propellant to the nozzle.

4. The gas generator as in claim 1, further comprising a second valve configured to be capable of substantially continuously adjusting a flow rate of the hot product gas through the heat exchanger.

5. The gas generator as in claim 1, wherein the gas generator is a rocket engine,
   wherein the nozzle has an expansion ratio of at least 3,
   wherein the nozzle is configured to expel the substantially gasified high-pressure liquid propellant substantially in one direction, and
   wherein the expulsion of the substantially gasified high-pressure liquid propellant causes an impulse reaction on the rocket engine in an opposite direction.

6. A cool gas generator comprising:
   a first storage tank configured to contain a high-pressure liquid propellant;
   a nozzle connected to the first storage tank;
   a heat source connected between the first storage tank and the nozzle and configured to add heat to the high-pressure liquid propellant at a heat transfer rate to substantially gasify the high-pressure liquid propellant, wherein the nozzle is configured to expel the substantially gasified high-pressure liquid propellant from the gas generator and, during the expulsion, to expand the substantially gasified high-pressure liquid propellant, and wherein the gas generator is configured so that an expanded temperature of the substantially gasified high-pressure liquid propellant after being expanded by the nozzle is in the range −50° C. to 100° C.; and
   a controller connected to the heat source and configured to adjust the heat transfer rate.

7. The gas generator as in claim 6, wherein the expanded temperature is in the range 0° C. to 50° C.

8. The gas generator as in claim 6, wherein the nozzle has a melting temperature,
   wherein the gas generator is configured so that an expansion temperature of the substantially gasified high-pressure liquid propellant to be expanded by the nozzle is substantially lower than the melting temperature,
   wherein the gas generator further comprises a temperature sensor connected to the controller and configured to measure the expansion temperature, and wherein the controller is configured to adjust the heat transfer rate based on the expansion temperature so as to adjust the expansion temperature to a target expansion temperature.

9. The gas generator as in claim 6, wherein the high-pressure liquid propellant comprises: a liquid that, at room temperature, has a vapor pressure substantially greater than 1 atm; and a decomposable chemical that decomposes upon reaction with a catalyst, and wherein the heat source comprises the catalyst.

10. The gas generator as in claim 6, wherein the heat source comprises: a second storage tank configured to contain a reactive chemical; a combustion chamber connected to the second storage tank and configured to chemically react the reactive chemical to form a hot product gas, and wherein the heat source is configured to mix the high-pressure liquid propellant with the hot product gas.

11. The gas generator as in claim 10, wherein substantially all of the hot product gas formed by the heat source remains a gas at the expanded temperature.

12. The gas generator as in claim 10, wherein a composition of the high-pressure liquid propellant and a composition of the hot product gas is substantially the same.

13. The gas generator as in claim 6, wherein the heat source comprises: a second storage tank configured to contain a reactive chemical; and a combustion chamber connected to the second storage tank and configured to chemically react the reactive chemical to form a hot product gas, wherein the controller comprises a valve to adjust the heat transfer rate from the hot product gas to the high-pressure liquid propellant, and wherein the gas generator is configured to be air-breathing, such that the reactive chemical is chemically reactive with air and the combustion chamber is configured to combust the reactive chemical with the air.

14. The gas generator as in claim 6, wherein the gas generator is a rocket engine, wherein the nozzle has an expansion ratio of at least 3, wherein the nozzle is configured to expel the substantially gasified high-pressure liquid propellant substantially in one direction, and wherein the expulsion of the substantially gasified high-pressure liquid propellant causes an impulse reaction on the rocket engine in an opposite direction.

15. An external combustion cool gas generator comprising:

means for providing a high-pressure liquid propellant;
a nozzle connected to the means;
a first heat source;
a first heat exchanger connecting the first heat source to at least one of the means and the nozzle so that heat from the first heat source is transferred to the high-pressure liquid propellant through heat-conducting walls of the first heat exchanger to thereby gasify the high-pressure liquid propellant;
a second heat source; and
a second heat exchanger connecting the second heat source to at least one of the means and the nozzle so that heat from the second heat source is transferred to the gasified high-pressure liquid propellant to thereby raise a temperature of the gasified high-pressure liquid propellant above a temperature of the high-pressure liquid propellant, wherein the nozzle is configured to expel the gasified high-pressure liquid propellant from the gas generator and, during the expulsion, to expand the gasified high-pressure liquid propellant.

16. The gas generator as in claim 15, wherein the gas generator is configured so that an expanded temperature of the substantially gasified high-pressure liquid propellant after being expanded by the nozzle is in the range 0° C. to 50° C.

17. The gas generator as in claim 15, further comprising a nozzle valve configured to be capable of substantially continuously adjusting a flow rate of the gasified high-pressure liquid propellant to the nozzle, wherein the nozzle valve is configured to regulate a pressure inside the means to a threshold operating pressure, such that: a) when the pressure is less than the threshold operating pressure, the valve is closed; and b) when the pressure rises above the threshold operating pressure, the valve variably opens as a function of the pressure, so that the pressure does not rise to substantially greater than the threshold operating pressure.

18. The gas generator as in claim 15, wherein at least one of the first and second heat sources comprises: a storage tank configured to contain a reactive chemical; and a combustion chamber configured to chemically react the reactive chemical to form a hot product gas at a pressure substantially lower than a pressure of the high-pressure liquid propellant, wherein the gas generator further comprises a nozzle valve configured to be capable of adjusting a flow rate of the gasified high-pressure liquid propellant to the nozzle, and wherein the first heat exchanger comprises a first valve configured to be capable of adjusting a flow rate of the hot product gas through the first heat exchanger, and the second heat exchanger comprises a second valve configured to be capable of adjusting a flow rate of the hot product gas through the second heat exchanger.

19. The gas generator as in claim 15, wherein the nozzle is configured to expel substantially only the substantially gasified high-pressure liquid propellant.

20. The gas generator as in claim 15, wherein the gas generator is a rocket engine, wherein the nozzle has an expansion ratio of at least 3, wherein the nozzle is configured to expel the gasified high-pressure liquid propellant substantially in one direction, and wherein the expulsion of the gasified high-pressure liquid propellant causes an impulse reaction on the rocket engine in an opposite direction.

* * * * *